(12) United States Patent
Hsiao et al.

(10) Patent No.: US 11,638,209 B2
(45) Date of Patent: Apr. 25, 2023

(54) WIRELESS ACCESS POINT AND STATION APPLIED IN WIRELESS COMMUNICATION SYSTEM AND COMMUNICATION METHOD

(71) Applicant: Realtek Semiconductor Corporation, Hsinchu (TW)

(72) Inventors: Cheng-Duom Hsiao, Zhubei (TW); Hsuan-Yen Chung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 157 days.

(21) Appl. No.: 17/148,715

(22) Filed: Jan. 14, 2021

(65) Prior Publication Data

US 2021/0243689 A1 Aug. 5, 2021

(30) Foreign Application Priority Data

Feb. 5, 2020 (TW) ................................. 109103589

(51) Int. Cl.
*H04W 52/02* (2009.01)
*H04W 76/28* (2018.01)
*H04W 88/08* (2009.01)
*H04W 68/02* (2009.01)

(52) U.S. Cl.
CPC ... *H04W 52/0206* (2013.01); *H04W 52/0216* (2013.01); *H04W 52/0229* (2013.01); *H04W 52/0235* (2013.01); *H04W 76/28* (2018.02); *H04W 88/08* (2013.01)

(58) Field of Classification Search
CPC ......... H04W 52/0206; H04W 52/0216; H04W 52/0229; H04W 52/0235; H04W 76/28; H04W 88/08; H04W 68/02; H04W 76/27; Y02D 30/70

USPC .......................................................... 370/311
See application file for complete search history.

(56) References Cited

U.S. PATENT DOCUMENTS

| | | | |
|---|---|---|---|
| 9,668,212 B2* | 5/2017 | Lee | H04L 1/1671 |
| 2006/0029023 A1 | 2/2006 | Cervello et al. | |
| 2008/0285464 A1 | 11/2008 | Katzir | |
| 2014/0153434 A1 | 6/2014 | Kokovidis et al. | |
| 2015/0139207 A1* | 5/2015 | Seok | H04W 52/0225 370/338 |
| 2016/0353080 A1* | 12/2016 | Nguyen | H04N 13/271 |
| 2017/0048858 A1* | 2/2017 | Ngo | H04W 16/14 |

\* cited by examiner

*Primary Examiner* — Inder P Mehra
(74) *Attorney, Agent, or Firm* — Locke Lord LLP; Tim Tingkang Xia, Esq.

(57) ABSTRACT

A wireless access point includes a memory and a processor. The processor is configured to access instructions stored in the memory, and execute the instructions to perform following steps: periodically transmitting a plurality of beacons to a station so that the station operates in a low power sleep mode or an active mode based on the beacons, in which the beacons includes two successive beacons; and, between the transmission of the two successive beacons, determining whether to transmit a management frame to the station based on a traffic condition of packets being directed to the station so that the station establishes a mode switching in response to the management frame. The traffic condition includes a channel state and a number or a validity of the packets. The mode switching includes switching from one of the low power sleep mode and the active mode to another.

12 Claims, 4 Drawing Sheets

WIRELESS ACCESS POINT AND STATION
APPLIED IN WIRELESS COMMUNICATION
SYSTEM AND COMMUNICATION METHOD

CROSS-REFERENCE TO RELATED
APPLICATION

This application claims priority to Taiwan Application Serial Number 109103589, filed Feb. 5, 2020, which is herein incorporated by reference in its entirety.

BACKGROUND

Field of Invention

The present application relates to a wireless communication system and communication method, in particular to a wireless access point and a station in the communication system, and a communication method applied to the wireless access point and the station.

Description of Related Art

In conventional communication systems, a wireless access point ("WAP") periodically transmits a beacon to each station to determine whether to wake up the station from a lower power sleep mode ("LPS mode") to enter the active mode, thereby responding to changes in transmission to each station. However, the aforementioned conventional communication systems will cause the hardware components in the station to stay in an unnecessary active mode for a long time, and thus increase the power consumption of the station.

SUMMARY

An embodiment of the present application is a wireless access point, including a memory and a processor, the processor is coupled to the memory. The processor accesses the instruction stored in the memory and executing the instruction for: periodically enabling the communication module to transmit a plurality of beacons to a station, so that the station is in an low power sleep mode or an active mode according to the beacons, wherein the beacons include a first beacon and a second beacon transmitted sequentially; and between the transmission of the first beacon and the second beacon, determining whether to transmit a management frame to the station based on a traffic condition of at least one packet being directed to the station, so that the station switches from the low power sleep mode to the active mode or from the active mode to the low power sleep mode in response to the management frame, wherein the traffic condition includes a channel state and a number or a validity of the at least one packet.

Another embodiment of the present application is a wireless access point, including a memory and a processor, the processor is coupled to the memory. The processor accesses the instruction stored in the memory and executing the instruction for: receiving a plurality of beacons transmitted by a wireless access point in the wireless communication system, and enabling the station to be in a low power sleep mode or an active mode according to the beacons, wherein the beacons include a first beacon and a neighboring second beacon; between receiving the first beacon and the second beacon, determining whether a management frame is received from the wireless access point station, the wireless access point determines whether to transmit the management frame according to a traffic condition of at least one packet being directed to the station, the traffic condition includes a channel state and a number or a validity of the at least one packet; and in response to the management frame, switching from the low power sleep mode to the active mode or from the active mode to the low power sleep mode.

It is to be understood that both the foregoing general description and the following detailed description are by examples, and are intended to provide further explanation of the invention as claimed.

DETAILED DESCRIPTION

Figure 1:
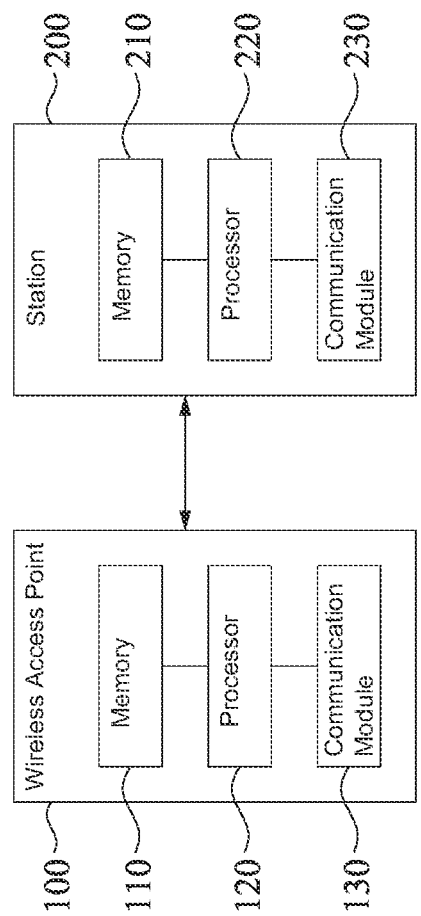
FIG. 1 is a schematic diagram of a communication system according to an embodiment of the present application.

FIG. 1 is a schematic diagram of a communication system according to an embodiment of the present application. In some embodiments, the communication system includes a wireless access point 100. The wireless access point 100 includes a memory 110, a processor 120, and a communication module 130. The processor 120 is electrically coupled to the memory 110 and the communication module 130. In some embodiments, the communication system further includes a station 200. The station 200 includes a memory 210, a processor 220, and a communication module 230. The processor 220 is electrically coupled to the memory 210 and the communication module 230.

In some embodiments, the processors 120, 220 may include, but are not limited to, a single processing circuit or the integration of a plurality of microprocessor circuits. The memories 110, 210 may be volatile or non-volatile internal or external memories. In some embodiments, the communication modules 130, 230 may include devices such as antennas, signal transceivers, modulators, demodulators, amplifiers, and baseband processors to transmit or receive radio signals.

The communication system in FIG. 1 only shows one station 200. In other embodiments, the communication system may include a plurality of stations 200, and the wireless access point 100 may perform unidirectional or bidirectional signal exchanges with each station 200, respectively. When the wireless access point 100 cooperates with multiple stations 200, the wireless access point 100 may periodically broadcast the beacons to the stations.

In practical applications, the station's processor can choose to enter the low power sleep ("LPS") mode, which belongs to the low-speed transmission state or sleep state in the protocol aspect. In this state, the station 200 still can communicate with the wireless access point 100 at a low rate or low data volume (for example, 1-1000 bits per second, or each packet can only contain 1-1000 bits of data payload). When the processor of the station 200 enters the low power sleep mode, the processor 220 can turn off the operation of some devices in the communication module 230, or reduce the operation efficiency of the devices to reduce power consumption.

The beacons can be understood as a network announcement frame, which is used to announce specific wireless network messages to the users (i.e., each station 200) within the wireless network coverage of the wireless access point 100, including the physical layer speed, security protocol, quality of service ("QoS"), Wi-Fi Multimedia ("WMM"), and traffic indication map ("TIM") and other information.

When the wireless access point 100 has packets that need to be transmitted to the station 200, while the wireless access point 100 broadcasts a beacon, an association ID ("AID") of the target station can be added to the partial virtual bitmap ("PVB") field of the traffic indication map of the beacon content. The target station confirms whether the target of the wireless access point to transmit the packet is itself according to whether the received beacon content carries its own identification code.

If the station 200 is currently in the low power sleep mode, the processor 220 may request the wireless access point 100 to transmit the packets by polling a power save poll frame. In this way, the wireless access point can transmit a small amount of packets to the station.

Alternatively, the processor of the station 200 can choose to enter the active mode, which pertains to the normal transmission state in the communication protocol aspect. At this time, the station 200 and the wireless access point 100 perform wireless transmission at a standard speed supported by the communication protocol (for example, the transmission of 1 megabyte per second supported by the IEEE 802.11 protocol to the transmission of 866 gigabyte per second supported by the IEEE 802.11 ac protocol). When the station 200 enters the active mode, in the hardware aspect, the processor 220 can start the operation of all devices in the communication module 230 or restore the operation efficiency of the devices. When the station 200 is in the active mode, the communication module 230 receives or transmits signals at a normal rate, but also increases power consumption.

In one embodiment, when the station 200 is in the active mode, the wireless access point may aggregate a large number of packets to reduce transmission in the format of Aggregated MAC Protocol Data Unit ("A-MPDU") for efficiently transmitting these packets to the station 200.

In an embodiment, the processor 220 of the station 200 can determine whether to enter the active mode or the low power sleep mode at the moment of receiving each beacon transmitted by the wireless access point 100, and then complete subsequent packet transmission in this mode. At the receipt of the next beacon, it will be possible to readjust the mode of station 200 (active mode or low power sleep mode). In other words, in this embodiment, after receiving the previous beacon to enter the active mode and completing the packet reception, the station 200 will maintain the active mode until the next beacon is received, and then determine whether to enter the low power sleep mode.

In some practical examples, when switching between low power sleep mode and active mode, some conventional stations only consider the time required for transmitting the number of packets in the low power sleep mode and the active mode, respectively, without considering the switching control time required to switch between the two modes. In fact, it takes a certain time for the wireless access point 100 and the station 200 to switch between the low power sleep mode and the active mode (transmission management frame and acknowledge frame, etc.). If only for a small number of packets, frequent switching between low power sleep mode and active mode may waste a lot of time in the process of mode switching, and will generate unnecessary energy consumption. In contrast, in the embodiments of the present disclosure, when the number of packets to be transmitted by the wireless access point 100 and the station 200 has not yet exceeded a certain threshold, the embodiments of the present disclosure can be kept in the low power sleep mode to avoid frequent switching to the active mode and thus wasting more switching time and generating higher energy consumption. The detailed implementation will be fully described in the following embodiments.

Figure 2:
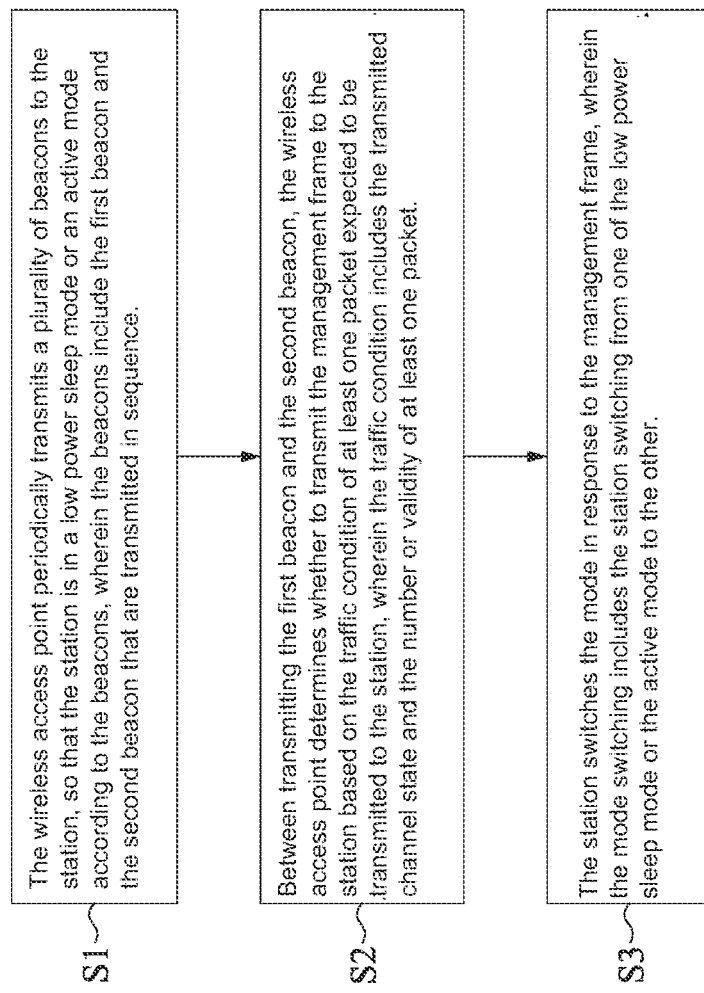
FIG. 2 is a flow chart of the steps of the communication method according to an embodiment of the present application.

FIG. 2 is a flow chart of the steps of the communication method according to an embodiment of the present application. In some embodiments, the communication method is implemented by the communication system (including the wireless access point 100 and the station 200) in FIG. 1, so please refer to the embodiment in FIG. 1 as well. In this embodiment, the steps of the communication system performing the communication method will be described in detail in the following paragraphs.

Step S1: The wireless access point periodically transmits a plurality of beacons to the station, so that the station is in a low power sleep mode or an active mode according to the beacons, wherein the beacons include the first beacon and the second beacon that are transmitted in sequence.

It should be understood that the wireless access point 100 and the station 200 in the present application support the current wireless network protocol. Under normal circumstances, the wireless access point 100 and the station 200 can still communicate through beacons periodically. The difference is that, among the beacons transmitted by the wireless access point 100 to the station 200, at least one beacon (e.g., the first beacon) includes a confirmation message for determining whether the station 200 supports the communication management function (or traffic condition management) of the present application.

Figure 3:
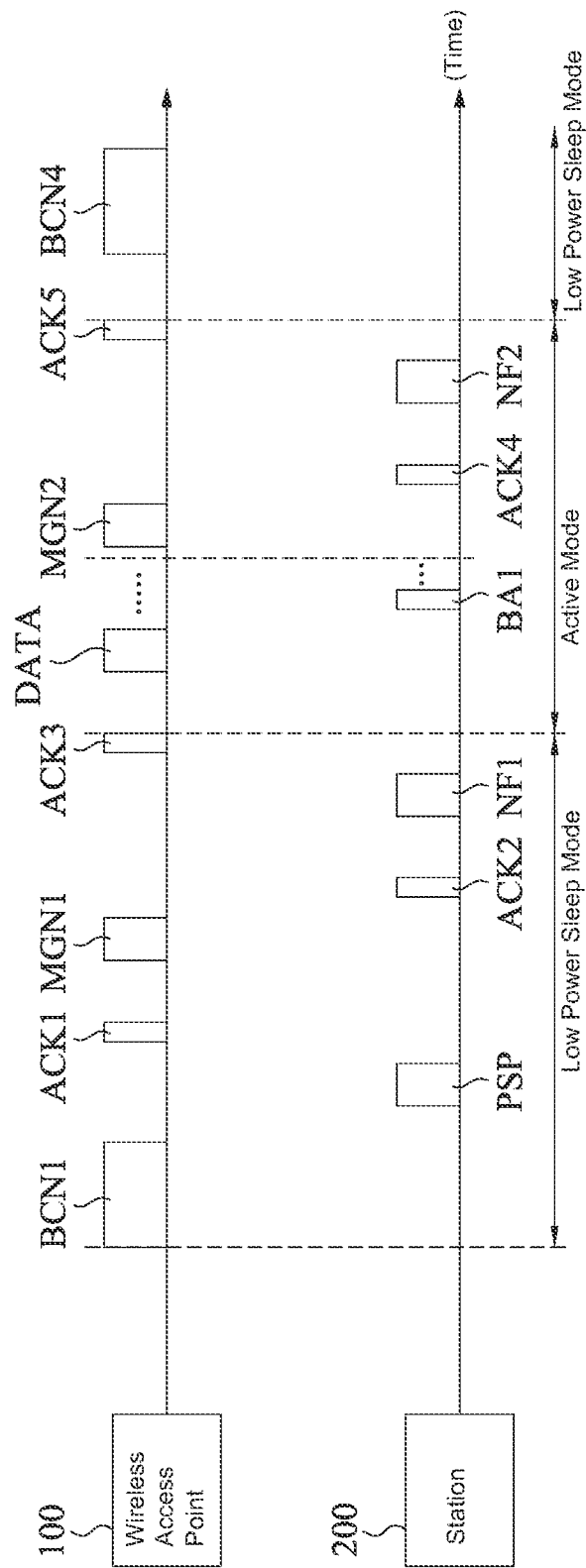
FIG. 3 is a timing diagram illustrating the operation of the communication system according to an embodiment of the present application.

FIG. 3 is a timing diagram illustrating the operation of the communication system according to an embodiment of the present case. In FIG. 3, the horizontal axis represents the time axis, the upper row shows the signals transmitted by the communication module 130 of the wireless access point 100, and the lower row shows the signals transmitted by the communication module 230 of the station 200.

Figure 4:
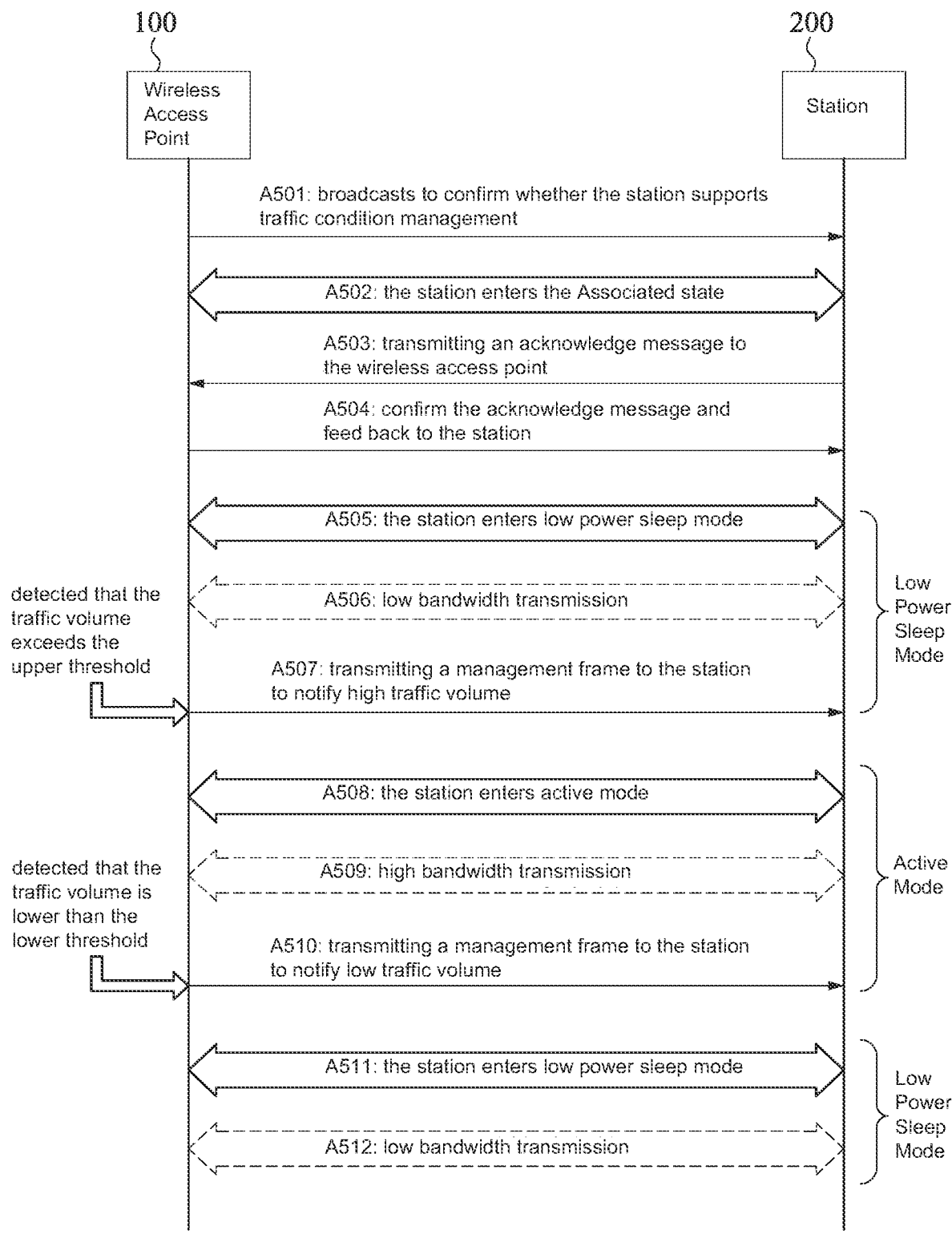
FIG. 4 is a flowchart of the operation of the communication system according to an embodiment of the present application.

Please refer to FIG. 4, which is a flow chart of the operation of the communication system according to an embodiment of the present application. The vertical line on the left side of FIG. 4 represents the wireless access point 100, and the vertical line on the right side of FIG. 4 represents the station 200. FIG. 4 illustrates the communication process between the wireless access point 100 and the station 200 with a top-down time axis.

It should be understood that in the embodiments of FIG. 3 and FIG. 4, the actions of the wireless access point 100 are performed by the processor 120, and the operations of the station 200 are performed by the processor 220, and will not be repeated hereafter.

As shown in FIG. 3, the wireless access point 100 broadcasts a beacon BCN1 to a station in the network, and the beacon BCN1 can be used to confirm whether the station supports traffic condition management. This action corresponds to action A501 performed by the wireless access point 100 as shown in FIG. 4: broadcasting to confirm whether the station 200 supports traffic condition management.

As shown in FIG. 4, in response to action A501, the station 200 performs action A502: entering a state called Associated. After entering the association state, the station 200 may determine the upper threshold and/or the lower threshold of the traffic condition according to the system preset value or the dynamic communication value. The two thresholds may be used by the wireless access point 100 to determine whether to notify the station 200 to switch the mode.

In some embodiments, the upper threshold and the lower threshold may be the same value. For example, the station 200 may set the upper threshold and the lower threshold to be the time required for 25 packets to remain in the low power sleep mode (low-speed transmission). The wireless access point 100 estimates a channel state according to the estimated packet number to be transmitted, and compares the channel state with the upper threshold and the lower threshold to determine whether to switch from the low power sleep mode to the active mode or continue to remain in the low power sleep mode. In one embodiment, the channel state includes an estimated time for active transmission. The estimated active transmission time includes the switching time required for the wireless access point 100 to switch from the low power sleep mode to the active mode, and the transmission time required to complete all the expected transmission packets in the active mode (high-speed transmission). The wireless access point 100 will compare with the upper and lower thresholds according to the estimated active transmission time. When the estimated active transmission time (the sum of both the switching time and the transmission time) is higher than the upper threshold, or the estimated active transmission time is lower than the lower threshold, the station 200 will be notified to switch mode.

In some embodiments, the upper threshold and the lower threshold may be two different values. For example, the station 200 may set the upper threshold to the time required for 75 packets to remain in the low power sleep mode (low-speed transmission), and the lower threshold to be the time required for 25 packets to remain in the low power sleep mode (low-speed transmission). The wireless access point 100 estimates an estimated active transmission time according to the estimated transmission packet number, and compares the estimated active transmission time with the upper threshold and the lower threshold to decide whether to switch from the low power sleep mode to the active mode or continue to remain in the low power sleep mode. When the estimated active transmission time is higher than the upper threshold, or the estimated active transmission time is lower than the lower threshold, the station 200 will be notified to switch mode. When the estimated active transmission time is between the upper threshold and the lower threshold, the wireless access point 100 does not notify the station 200 to switch mode, so that the station 200 maintains the current state.

In some embodiments, the upper threshold and/or the lower threshold may be set by the station 200 (or the user of the station 200) according to the transmission efficiency required (or tolerable) by the station 200. For example, if the station 200 is a communication node with only a low power capacity (such as a wireless radio frequency tag device for the Internet of Things), the station 200 may set both the upper threshold and the lower threshold to higher values (for example, the upper threshold is the time required for 125 packets to maintain low-speed transmission in low power sleep mode, and the lower threshold is the time required for 75 packets to maintain low-speed transmission in low power sleep mode). On the other hand, assuming that the station 200 is a communication node requiring fast response, the station 200 may set both the upper threshold and the lower threshold to lower values (for example, the upper threshold is the time required for 30 packets to maintain low-speed transmission in low power sleep mode, and the lower threshold is the time required for 10 packets to maintain the low-speed transmission of the low power sleep mode).

In some embodiments, the upper threshold and/or lower threshold is the total number of packets that the station 200 wants to retrieve from the wireless access point 100 times the time required to transmit a single polling frame (since only one packet can be carried in one polling frame).

Following the action A502, the station 200 executes the action A503: transmitting a acknowledge message to the wireless access point 100. The acknowledge message may include an upper threshold and a lower threshold. In this way, the station 200 can notify the wireless access point 100 that it can support traffic condition management.

In response to action A503, the wireless access point 100 performs action A504: confirm the acknowledge message and feed back to the station 200. In some embodiments, the wireless access point 100 may receive the acknowledge message, confirm the upper threshold and the lower threshold, and then transmit the feedback message to the station 200. For example, the feedback message may include a message representing a successful confirmation status (Successful Status), and the initial status is a low traffic status. Accordingly, the wireless access point 100 is allowed to control the mode of the station 200 according to the traffic condition function.

Because the beacon BCN1 shows that the traffic volume is low. In response to action A504, the station 200 executes action A505: enter low power sleep mode. In the low power sleep mode, the processor 220 can turn off some devices in the communication module 230 or reduce its efficiency to reduce energy consumption.

As shown in FIG. 4, in the low power sleep mode, the station 200 can still perform action A506: low bandwidth transmission. As shown in FIG. 3, the beacon BCN1 indicates that the traffic volume is low, and the station 200 can still transmit the polling frame PSP to the wireless access point 100 in the low power sleep mode, and the wireless access point 100 can respond to the acknowledge frame ACK1. In this way, the wireless access point 100 can perform low bandwidth transmission to the station 200 according to the polling frame PSP.

Step S2: Between transmitting the first beacon and the second beacon, the wireless access point determines whether to transmit the management frame to the station based on the traffic condition of at least one packet expected to be transmitted to the station, wherein the traffic condition includes the transmitted channel state and the number or validity of at least one packet.

As described above, if the station 200 receives the beacon BCN2 according to the process of the actual example, the station 200 will continue to maintain the low power sleep mode.

Different from the actual example, in some embodiments of the present application, since the station 200 supports traffic condition management, the wireless access point 100 can determine according to the traffic condition whether to transmit the management frame MGN1 to the station 200 between the beacon BCN1 and the beacon BCN2 (as shown in FIG. 4), to further control the operation mode of the station 200.

As shown in FIG. 3, if the wireless access point 100 determines that the estimated active transmission time estimated by the number of packets expected to be transmitted to the station 200 exceeds the upper threshold, it is in a state of high traffic, and the wireless access point 100 will transmit the management frame MGN1 to the station 200. As shown in FIG. 4, the wireless access point 100 performs action A507: transmits a management frame to the station 200 to notify the high traffic volume.

Step S3: The station switches the mode in response to the management frame, wherein the mode switching includes the station switching from one of the low power sleep mode or the active mode to the other.

As shown in FIG. 4, in response to action A507, the station 200 will perform action A508: enter active mode. In the active mode, the processor 220 can control the communication module 230 to turn on the closed device or improve its operating efficiency, and enter a ready state for high-bandwidth transmission.

As shown in FIG. 3, the station 200 may first respond to the management frame MGN1 with an acknowledge frame ACK2, and then transmit a null frame NF1 with a power bit value of zero to the wireless access point 100. The wireless access point 100 can respond with an acknowledgment frame ACK3 to the null frame NF1 to confirm that the station 200 enters the active mode.

After confirming that the station 200 enters the active mode, the wireless access point 100 may perform action A509: high-bandwidth transmission. As shown in FIG. 4, the wireless access point 100 can transmit data DATA to the station 200 in the A-MPDU format, and the station 200 can respond with the data acknowledge frame BA for the data DATA.

After that, the wireless access point 100 may continue high-frequency bandwidth transmission until the wireless access point 100 determines that the estimated active transmission time of the number of packets expected to be transmitted to the station 200 is lower than the lower threshold, and the wireless access point 100 may perform action A510: transmit the management frame to the station 200 to notify the low traffic volume.

As shown in FIG. 3, if the wireless access point 100 determines that the number of packets expected to be transmitted to the station 200 is lower than the lower threshold, the wireless access point 100 may transmit the management frame MGN2 to the station 200. The station 200 may respond to the management frame MGN2 with an acknowledge frame ACK4.

As shown in FIG. 4, in response to action A510, the station 200 may perform action A511: enter the low power sleep mode. As shown in FIG. 3, the station 200 can transmit a null frame NF2 with a power bit value of one to the wireless access point 100. The wireless access point 100 may respond to the null frame NF2 with an acknowledgement frame ACK5. At this point, the station 200 leaves the active mode, and the processor 220 may turn off some devices in the communication module 230 or reduce its operating efficiency, and enter the low power sleep mode. Similarly, the station 200 may again perform the action A512: low-bandwidth transmission.

In some embodiments, the wireless access point 100 may also determine whether to transmit management frames (e.g., management frames MGN1-MGN2) to the station 200 according to the validity of the data, so as to control the station 200 to switch mode. In some embodiments, the validity of the data includes at least a short validity and a long validity. However, the present application is not limited thereto.

In some embodiments, the short validity means that the wireless access point 100 needs to transmit the data to the station 200 in a relatively short time (for example, 10 ms). If the wireless access point 100 determines that the validity of the data expected to be transmitted to the station 200 is short, the wireless access point 100 may transmit a management frame to the station 200 (if the station is not in the active mode), so that the station 200 switches from the low power sleep mode to the active mode to facilitate the wireless access point 100 to perform high-speed (or high-bandwidth) data transmission.

In some embodiments, long validity means that the wireless access point 100 can transmit the data to the station 200 in a relatively long time (for example, not particularly limited). If the wireless access point 100 determines that the validity of the data expected to be transmitted to the station 200 is long, the wireless access point 100 may transmit the management frame to the station 200 (if the station is in the active mode), so that the station 200 switches from the active mode to the low power sleep mode, and the data can be transmitted at a low speed (or low bandwidth).

According to the above embodiment, the wireless access point 100 in the present application can control the station 200 to perform more than one time of mode switching between the two beacons according to the management frame according to the expected data transmission volume and the validity of data transmitted to the station 200, instead of being restricted by the standard wireless network protocol framework. In this way, the power consumption of the station 200 can be further saved according to the data transmission state.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present application cover modifications and variations of this application provided they fall within the scope of the following claims. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless access point applied in a wireless communication system, comprising:
   a memory, configured to store at least one instruction;
   a communication module; and
   a processor, coupled to the memory and the communication module, and configured to access and execute the at least one instruction for:
   periodically enabling the communication module to transmit a plurality of beacons to a station, so that the station is in an low power sleep mode or an active mode according to the beacons, wherein the beacons include a first beacon and a second beacon transmitted sequentially; and
   between transmitting the first beacon and transmitting the second beacon, determining whether to transmit a management frame to the station based on a traffic condition of at least one packet being directed to the station, so that the station switches from the low power sleep mode to the active mode or from the active mode to the low power sleep mode in response to the management frame,
wherein the processor is further configured to access and execute the at least one instruction for:
transmitting at least one of the beacons which includes a confirmation message configured to confirm whether the station supports receiving the management frame; and
if the station responds to the confirmation message with a acknowledge message, transmitting the management frame to the station according to the traffic condition,
wherein the traffic condition includes a channel state and a number or a validity of the at least one packet.

2. The wireless access point of claim 1, wherein the processor is further configured to access and execute the at least one instruction for:
receiving an upper threshold and a lower threshold attached to the acknowledge message; and
comparing the traffic condition with one of the upper threshold and the lower threshold to determine whether to transmit the management frame.

3. The wireless access point of claim 2, wherein the processor comparing the channel state with one of the upper threshold and the lower threshold to determine whether to transmit the management frame comprises:
if the channel state exceeds the upper threshold, transmitting the management frame to the station to switch the station from the low power sleep mode to the active mode; and
if the channel state is lower than the lower threshold, transmitting the management frame to the station to switch the station from the active mode to the low power sleep mode.

4. The wireless access point of claim 1, wherein the processor is further configured to access and execute the at least one instruction for:
if the validity matches a short validity, transmitting the management frame to the station to switch the station from the low power sleep mode to the active mode; and
if the validity matches a long validity, transmitting the management frame to the station to switch the station from the active mode to the low power sleep mode.

5. A station applied in a wireless communication system, comprising:
a memory, configured to store at least one instruction;
a communication module; and
a processor, coupled to the memory and the communication module, and configured to access and execute the at least one instruction for:
receiving a plurality of beacons transmitted by a wireless access point in the wireless communication system, and enabling the station to be in a low power sleep mode or an active mode according to the beacons, wherein the beacons include a first beacon and a neighboring second beacon;
between receiving the first beacon and receiving the second beacon, determining whether a management frame is received from the wireless access point station, wherein the wireless access point determines whether to transmit the management frame according to a traffic condition of at least one packet being directed to the station, the traffic condition includes a channel state and a number or a validity of the at least one packet; and
in response to the management frame, switching from the low power sleep mode to the active mode or from the active mode to the low power sleep mode,
wherein the processor is further configured to access and execute the at least one instruction for:
determining whether at least one of the beacons includes a confirmation message, wherein the confirmation message is used by the wireless access point to confirm whether the station supports a reception of the management frame; and
sending, by the communication module, a acknowledge message to the confirmation message to enable the wireless access point to transmit the management frame according to the traffic conditions.

6. The station of claim 5, wherein the processor is further configured to access and execute the at least one instruction for:
receiving an upper threshold and a lower threshold attached to the acknowledge message; and
comparing the traffic condition with one of the upper threshold and the lower threshold to determine whether to transmit the management frame.

7. The station of claim 6, wherein the processor comparing the channel state with one of the upper threshold and the lower threshold to determine whether to transmit the management frame comprises:
if the channel state corresponding to the received management frame exceeds the upper threshold, controlling the station to switch from the low power sleep mode to the active mode; and
if the channel state corresponding to the received management frame is lower than the upper threshold, controlling the station to switch from the active mode to the low power sleep mode.

8. The station of claim 5, wherein the processor is further configured to access and execute the at least one instruction for:
if the received management frame corresponds to the validity matching a short validity, controlling the station to switch from the low power sleep mode to the active mode; and
if the received management frame corresponds to the validity matching a long validity, controlling the station to switch from the active mode to the low power sleep mode.

9. A communication method, used in a wireless access point and a station, wherein the communication method comprising:
the wireless access point periodically transmitting a plurality of beacons to the station, so that the station is in an low power sleep mode or an active mode according to the beacons, wherein the beacons include a first beacon and a second beacon transmitted sequentially;
between transmitting the first beacon and transmitting the second beacon, the wireless access point determining whether to transmit a management frame to the station based on a traffic condition of at least one packet being directed to the station, wherein the traffic condition includes a number or a validity of the at least one packet; and
the station switches from the low power sleep mode to the active mode or from the active mode to the low power sleep mode in response to the management frame,
wherein the communication method further comprises:
the wireless access point transmitting at least one of the beacons which includes a confirmation message configured to confirm whether the station supports receiving the management frame; and
if the station responds to the confirmation message with a acknowledge message to the wireless access point, the wireless access point transmitting the management frame to the station according to the traffic condition.

10. The communication method of claim 9, further comprising:
   the station attaching an upper threshold and a lower threshold in the acknowledge message;
   the wireless access point receiving the upper threshold and the lower threshold; and
   the wireless access point comparing the traffic condition with one of the upper threshold and the lower threshold to determine whether to transmit the management frame.

11. The communication method of claim 10, wherein the wireless access point comparing the traffic condition with one of the upper threshold and the lower threshold to determine whether to transmit the management frame comprises:
   if the wireless access point determines that the number is higher than the upper threshold, transmitting the management frame to the station to switch the station from the low power sleep mode to the active mode; and
   if the wireless access point determines that the number is lower than the lower threshold, transmitting the management frame to the station to switch the station from the active mode to the low power sleep mode.

12. The communication method of claim 9, further comprising:
   if the wireless access point determines that the validity matches a short validity, the wireless access point transmitting the management frame to the station to switch the station from the low power sleep mode to the active mode; and
   if the wireless access point determines that the validity matches a long validity, the wireless access point transmitting the management frame to the station to switch the station from the active mode to the low power sleep mode.

* * * * *